US011442926B2

(12) United States Patent
Jo

(10) Patent No.: US 11,442,926 B2
(45) Date of Patent: Sep. 13, 2022

(54) METHOD AND SYSTEM FOR STORING DRIVING RECORD DATA BASED ON BLOCK CHAIN

(71) Applicant: NHN Corporation, Gyeonggi-do (KR)

(72) Inventor: Youngjun Jo, Gyeonggi-do (KR)

(73) Assignee: NHN CORPORATION, Gyeonggi-do (KR)

( * ) Notice: Subject to any disclaimer, the term of this patent is extended or adjusted under 35 U.S.C. 154(b) by 292 days.

(21) Appl. No.: 16/559,434

(22) Filed: Sep. 3, 2019

(65) Prior Publication Data

US 2020/0073864 A1 Mar. 5, 2020

(30) Foreign Application Priority Data

Sep. 5, 2018 (KR) .................. 10-2018-0106022
Sep. 5, 2018 (KR) .................. 10-2018-0106062

(51) Int. Cl.

| G06F 16/00 | (2019.01) |
| G06F 16/23 | (2019.01) |
| G06F 21/60 | (2013.01) |
| H04W 4/024 | (2018.01) |
| H04L 67/12 | (2022.01) |
| H04W 4/46 | (2018.01) |
| G06F 16/25 | (2019.01) |

(Continued)

(52) U.S. Cl.
CPC ........ *G06F 16/2379* (2019.01); *G06F 16/258* (2019.01); *G06F 21/602* (2013.01); *H04L 67/12* (2013.01); *H04W 4/024* (2018.02); *H04W 4/46* (2018.02); *H04W 12/033* (2021.01); *H04L 67/1097* (2013.01)

(58) Field of Classification Search
CPC combination set(s) only.
See application file for complete search history.

(56) References Cited

U.S. PATENT DOCUMENTS 10,284,654 B2 * 5/2019 Alvarez .................. G06F 21/64
10,628,906 B2 * 4/2020 Zachary .................. H04N 7/18
11,161,519 B2 * 11/2021 Phillips .................... G07C 5/02
(Continued)

FOREIGN PATENT DOCUMENTS

| JP | 2009-32143 | 2/2009 |
| JP | 2013-23100 | 2/2013 |

(Continued)

OTHER PUBLICATIONS

Office Action dated Nov. 20, 2019 for Korean Application No. 10-2018-0106022 and its English machine translation by Google Translate.

(Continued)

*Primary Examiner* — Farhan M Syed
(74) *Attorney, Agent, or Firm* — Ladas & Parry, LLP

(57) ABSTRACT

A method for storing driving record data based on a blockchain comprises generating and storing driving record information associated with a driving of a vehicle; detecting occurrence of a predetermined event to the vehicle; if the occurrence of the event is detected, extracting driving record information related to the event from the stored driving record information; converting the extracted driving record information into transaction data; and transmitting the converted transaction data to a consortium blockchain network system.

16 Claims, 8 Drawing Sheets

(51) Int. Cl.
*H04W 12/033* (2021.01)
*H04L 67/1097* (2022.01)

(56) References Cited

U.S. PATENT DOCUMENTS

| | | | |
|---|---|---|---|
| 2010/0201819 | A1 | 8/2010 | Minowa |
| 2018/0018723 | A1* | 1/2018 | Nagla .................... H04L 9/3236 |
| 2018/0061237 | A1* | 3/2018 | Erickson ............... G08G 1/0112 |
| 2018/0091596 | A1* | 3/2018 | Alvarez .................. H04L 67/12 |
| 2018/0117446 | A1* | 5/2018 | Tran ..................... A42B 3/0433 |
| 2018/0117447 | A1* | 5/2018 | Tran ..................... G06Q 20/382 |
| 2018/0211524 | A1 | 7/2018 | Furuichi et al. |
| 2018/0264347 | A1* | 9/2018 | Tran ..................... A63B 43/004 |
| 2019/0190720 | A1 | 6/2019 | Falk |
| 2019/0361917 | A1* | 11/2019 | Tran ..................... G06Q 20/308 |
| 2019/0385269 | A1* | 12/2019 | Zachary .................. H04N 7/188 |
| 2020/0023846 | A1* | 1/2020 | Husain .................. H04W 4/027 |
| 2020/0169422 | A1* | 5/2020 | Ingraham ............... H04L 9/085 |

FOREIGN PATENT DOCUMENTS

| | | |
|---|---|---|
| JP | 2018-55203 | 4/2018 |
| KR | 10-2010-0056600 | 5/2010 |
| KR | 10-1751025 | 6/2017 |
| KR | 10-1781583 | 9/2017 |
| WO | 2018/036700 | 3/2018 |

OTHER PUBLICATIONS

Notice of Allowance dated Jul. 1, 2020 for Korean Patent Application No. 10-2018-0106022 and its English machine translation from Global Dossier.
Office Action dated Apr. 29, 2020 for Korean Patent Application No. 10-2018-0106022 and its English machine translation from Global Dossier.
Office Action dated Nov. 20, 2019 for Korean Patent Application No. 10-2018-0106062 and its English machine translation from Global Dossier.
Notice of Allowance dated Apr. 29, 2020 for Korean Patent Application No. 10-2018-0106062 and its English machine translation from Global Dossier.
Notice of Allowance dated May 26, 2021 for Japanese Patent Application No. 2019-162256 and its English machine translation from Global Dossier.
Office Action dated Oct. 6, 2020 for Japanese Patent Application No. 2019-162256 and its English machine translation from Global Dossier.

* cited by examiner

METHOD AND SYSTEM FOR STORING DRIVING RECORD DATA BASED ON BLOCK CHAIN

CROSS REFERENCE TO RELATED APPLICATION(S)

This application claims the priority to Korean Patent Application Nos. 10-2018-0106062 and 10-2018-0106022, filed on Sep. 5, 2018 which are all hereby incorporated by reference in their entireties.

BACKGROUND

Technical Field

The present disclosure generally relates to a method for generating and/or storing driving record data or information based on a blockchain and a system performing the method. More specifically, the present disclosure is related to a method for generating and/or storing driving record data or information based on a blockchain, which improves security by storing driving records related to an event by using a blockchain when the event occurs related to a vehicle, the driving of the vehicle, or a vehicle operator, and a system performing the method.

Related Art

A vehicle may be a machine that transport a user or operator riding in the vehicle in a direction desired by the user or operator. Typical examples of the vehicle are a car, a motorbike, a motorized scooter or bicycle, and any transportation machine.

Recently, cars have evolved to intelligent cars providing autonomous navigation or driving convenience functions. The intelligent cars are also known as smart cars, which refer to cutting-edge vehicles combining information technology with the automobile technology. The intelligent cars may not only facilitate adoption of the state-of-the-art system for the cars themselves but also provide optimal traffic efficiency through interworking with the Intelligent Transportation System (ITS).

The intelligent cars exchange necessary information wirelessly not only through vehicle-to-vehicle (V2V) communication but also through vehicle-to-infrastructure (V2I) communication, thereby ensuring safe driving among cars and driving with optimal traffic efficiency.

Also, the intelligent car is able to assist a driver to drive safely by using various advanced sensors and electronic devices, and thus, vehicles equipped with a driving assistance function that improves driving safety and convenience are getting great attention.

For example, various Advanced Driving Assist System (ADAS) functions such as lane departure warning, lane keeping, emergency braking, and blind spot warning functions have been developed and applied to the vehicles.

Moreover, the intelligent car is now providing an autonomous navigation function that autonomously understands the situation of the surroundings, and operates and navigates the vehicle without involving the driver's intervention in driving.

A blockchain is one of newly emerging technologies along with the autonomous navigation. The blockchain is a data forgery and falsification prevention technology based on the distributed computing technology, where data to be managed are packed in small-sized records, called 'blocks' and stored in a distributed data storage environment in the form of chains created through a P2P scheme, and therefore no one is allowed to arbitrarily alter the stored data, and any one may retrieve the result of modifications.

It is with respect to these and other general considerations that the following embodiments have been described. Also, although relatively specific problems have been discussed, it should be understood that the embodiments should not be limited to solving the specific problems identified in the background.

RELATED ART REFERENCES

Patents (Patent 001) Korean Patent No. 10-1751025 B1

SUMMARY

The driving assistance or autonomous navigation function may improve the user's daily life. However, when an accident occurs to a vehicle equipped with the aforementioned function, it will be difficult to identify the cause of the accident.

More specifically, it is difficult to clearly determine whether the accident has been caused by operation of the vehicle driver/operator, malfunction of the driving assistance function or autonomous navigation function, internal or mechanical failure of the vehicle, or external situation.

In particular, for ordinary users who are non-experts, it is extremely difficult to prove that the accident is due to the malfunction of the autonomous navigation function while navigation function service providers, who are experts in this application, may clearly understand the data due to the operation of the navigation function and readily modify the data related to the driving of the vehicle. Therefore, in determining the cause of the accident, users are in a relatively disadvantageous position.

Therefore, some embodiments of the present disclosure have been made to solve the problems above and intend to store and manage driving record information generated associated with the driving of a vehicle by using a blockchain.

Also, certain embodiments of the present disclosure have been made to protect personal information included in the driving record information and protect privacy at the time of storing the driving record information so that proprietary techniques of a service provider and/or vehicle manufacturer are protected.

Also, some embodiments of the present disclosure have been made to transfer driving record information to a blockchain network quickly and correctly when a vehicle accident occurs.

A method for storing driving record data based on a blockchain according to an embodiment comprises generating and storing driving record information generated as a vehicle drives along; detecting an occurrence of an event to the vehicle; if the occurrence of the event is detected, extracting the driving record information related to the event; converting the extracted driving record information into transaction data; and transmitting the converted transaction data to a consortium blockchain network system.

At this time, the generating and storing driving record information may include storing driving record information generated when the vehicle drives along in an autonomous navigation mode.

Also, the driving record information may include at least one or more of vehicle status information, driving control information, vehicle surrounding information, and vehicle condition information.

Also, the extracting driving record information related to the event may include extracting driving record information at the occurrence of the event and driving record information before the occurrence of the event.

Also, the event may include at least one status among accident occurrence, user request, and vehicle breakdown.

Also, if no event occurs to the vehicle for a predetermined time period, driving record information before the predetermined time period may be deleted.

Also, the converting extracted driving record information to transaction data may include selecting at least part of the driving record information and arranging the selected information according to a standard rule.

Also, the converting extracted driving record information to transaction data may further comprise including at least part of the arranged information in front data.

Also, the converting extracted driving record information to transaction data may further comprise encrypting the remainder of the arranged information and including the encrypted information in main data.

Also, the converting extracted driving record information to transaction data may further comprise adding verify data created by verifying the front and the main data.

Also, the transmitting converted transaction data to a consortium blockchain network system may include transmitting the transaction data to one node of the blockchain network system through a public network by the vehicle.

Also, the transmitting converted transaction data to a consortium blockchain network system may include transmitting the transaction data to a traffic communication facility already connected to the consortium blockchain network system and transmitting the transmitting data to one node of the blockchain network system by the traffic communication facility.

Also, the transmitting converted transaction data to a consortium blockchain network system may include transmitting the transaction data to other vehicle already connected to the consortium blockchain network system and transmitting the transaction data to one node of the blockchain network system by the other vehicle.

Also, the transmitting converted transaction data to a consortium blockchain network system may include detecting a communication facility in the best communication condition, transmitting transaction data to the detected communication facility, and transmitting the transaction data to one node of the blockchain network system by the communication facility that has received the transaction data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DESCRIPTION OF EXEMPLARY EMBODIMENTS

Since the present invention may be modified in various ways and may provide various embodiments, specific embodiments will be depicted in the appended drawings and described in detail with reference to the drawings. The effects and characteristics of the present invention and a method for achieving them will be clearly understood by referring to the embodiments described later in detail together with the appended drawings. However, it should be noted that the present invention is not limited to the embodiment disclosed below but may be implemented in various forms. In the following embodiments, the terms such as first and second are introduced to distinguish one element from the others, and thus the technical scope of the present invention should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present invention is not necessarily limited to what has been shown in the figure.

A vehicle described in the present disclosure may be a concept including a car and a motorcycle. However, the present disclosure is not limited to specific types of vehicles and may be applied to all kinds of vehicles that may be used for transport in general. For illustration purposes, descriptions about the vehicle will mainly refer to a car.

The vehicle described in the present disclosure may be, for example, but not limited to, an internal combustion vehicle using an engine as a power source, hybrid vehicle using an engine and electric motors as a power source, and electric vehicle using electric motors as a power source.

Figure 1:
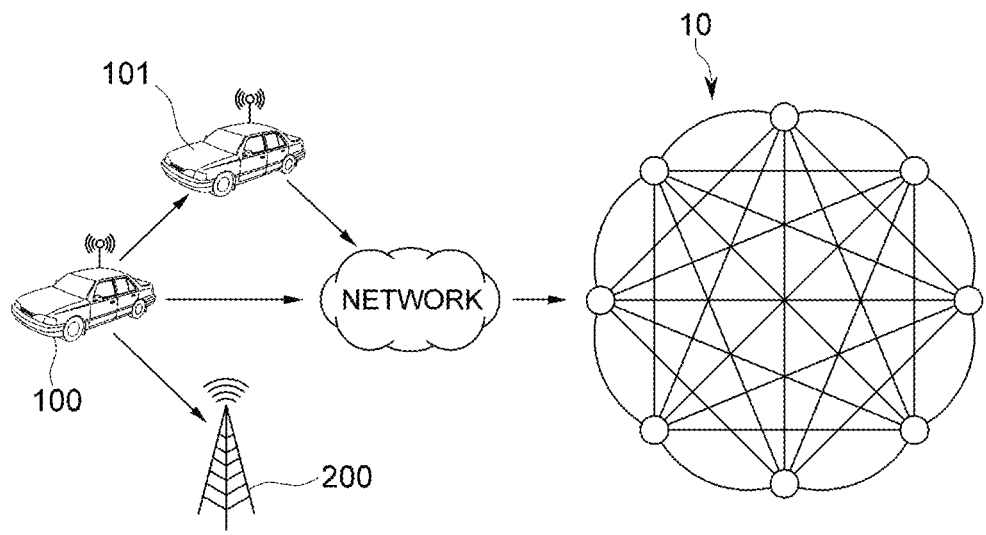
FIG. 1 illustrates a driving record data storage system associated with a blockchain according to an embodiment of the present disclosure.

FIG. 1 illustrates a driving record data storage system based on a blockchain according to an embodiment of the present disclosure.

Referring to FIG. 1, a driving record data storage system based on a blockchain according to an embodiment of the present disclosure may include a vehicle 100 (or a driving record transmission device installed inside the vehicle 100), another vehicle 101, a traffic communication facility, system or device 200 (infrastructure), a public network, and a blockchain network system 10.

Vehicle 100

Figure 2:
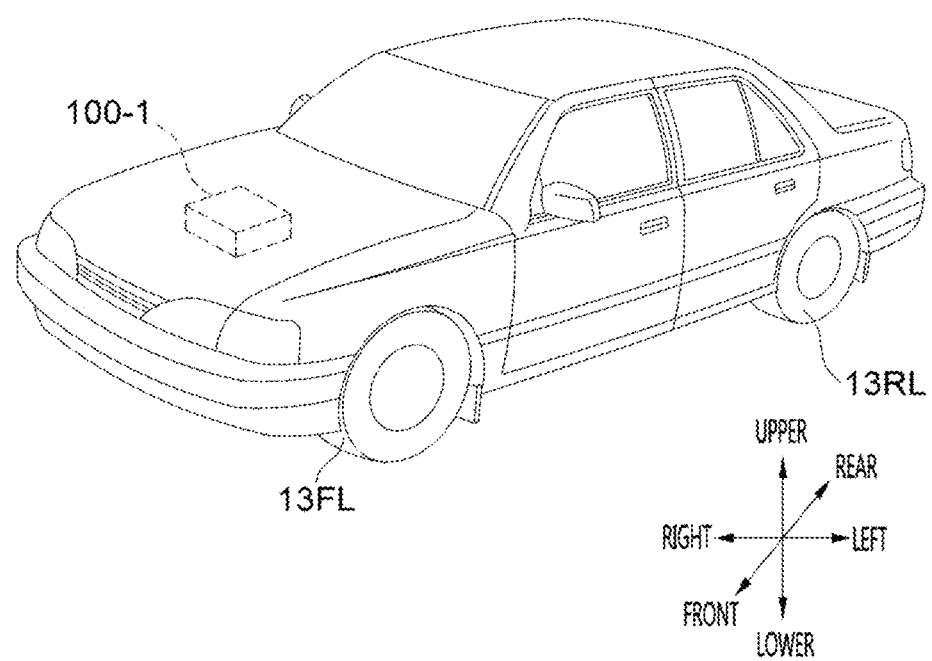
FIG. 2 illustrates a vehicle according to an embodiment of the present disclosure.
Figure 3:
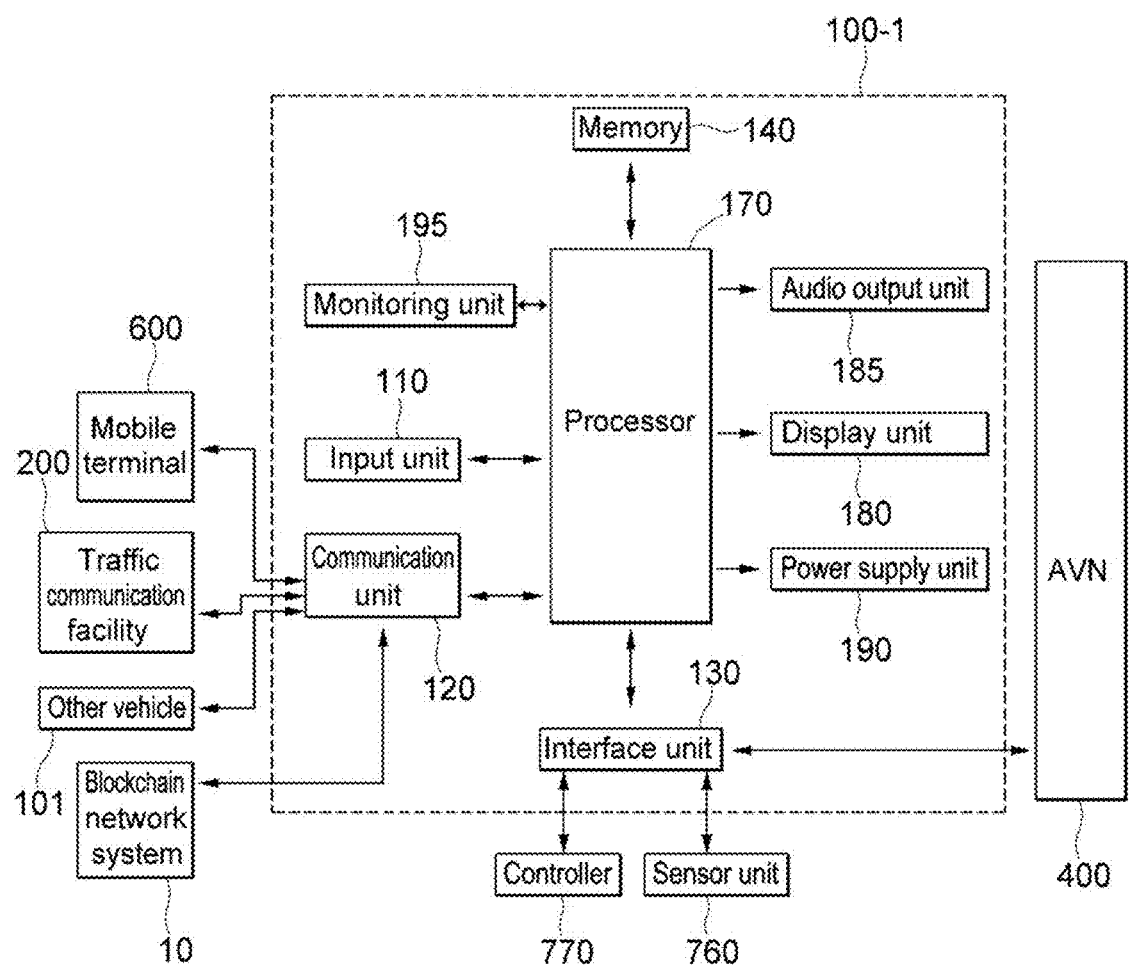
FIG. 3 is a block diagram of a driving record transmission device according to an embodiment of the present disclosure.

FIG. 2 illustrates an external appearance of a vehicle according to an embodiment of the present disclosure, and FIG. 3 is a block diagram of a driving record transmission device according to an embodiment of the present disclosure.

Referring to FIGS. 2 to 3, the vehicle 100 according to an embodiment of the present disclosure may include wheels 13FL, 13FR rotated by a power source, driving means for controlling driving of the vehicle 100, and a driving record transmission device 100-1.

In the embodiment, the vehicle 100 is capable of providing an autonomous navigation function and/or Advanced Driver Assistance Systems (ADAS). Here, the ADAS is a system that aids a vehicle driver by assisting a part of the driving activity through the automatic control of the vehicle while the vehicle driver drives the vehicle 100. For example, the vehicle 100 may provide at least one or more of the Blind Spot Detection (BSD) function, Lane Keeping Assist System (LKAS) function, Lane Departure Warning System (LDWS) function, cruise function, or Automatic Emergency Braking (AEB) function as the driving assistance function.

To realize or implement the autonomous navigation function and/or driving assistance function (hereinafter "driving function"), the vehicle 100 may include a controller controlling a vehicle controller (for example, transmission, acceleration, steering, and/or braking controllers) for automatic or autonomous driving of the vehicle. The driving assistance function may be executed directly by the driving record transmission device 100-1, executed within the vehicle itself, or executed by a separately provided device.

And, driving record information may be obtained in real-time while the driving function is being provided and/or a driver is driving the vehicle 100 manually. The driving record information may be any information associated with a driver, a vehicle operator, a vehicle and/or the driving of the vehicle. For example, the driving record information may include one or more of the vehicle status information, driving control information, vehicle surrounding information, and vehicle condition information.

The driving record information generated in real-time may be used as important information in determining who or which vehicle has to take responsibility for the occurrence of a vehicle accident.

Therefore, the vehicle 100 needs to store and manage the driving record information at the occurrence of an event such as accident occurrence, user request and/or vehicle breakdown. The stored driving record information may need to be stored in a secure condition so that forgery or falsification is impossible.

To this end, according to the embodiment of the present disclosure, the vehicle 100 may further include the driving record transmission device 100-1 that is configured to transmit driving record information to the blockchain network system 10.

According to certain embodiments, the vehicle 100 or a separate device providing the driving function may directly transmit driving records. However, in those embodiments, there may be concern that the manufacturer of the vehicle 100 or a service provider providing the driving function may alter the driving record information in advance.

Therefore, the driving record transmission device 100-1, as a device such as a black box installed separately inside the vehicle 100, may identify and retrieve the driving record information related to an event at the occurrence of the event and transmit the identified driving record information to the blockchain network system 10 fast and correctly.

Driving Record Transmission Device 100-1

Referring to FIG. 3, the driving record transmission device 100-1 may include an input unit 110, communication unit 120, interface unit 130, memory 140, processor 170, audio output unit 185, display unit 180, and power supply unit 190.

First, the driving record transmission device 100-1 may include an input unit 110 detecting an input of a user such as a vehicle operator. The user may turn on or off a driving record transmission function through the input unit 110 or apply an execution input that turns on or off the power of the driving record transmission device 100-1. Also, through the input unit 110, the user may apply an input that retrieves and checks the driving record information stored previously in the blockchain network system 10.

The input unit 110 may detect a user input. For example, the input unit 110 may include one or more of a gesture input unit detecting a user gesture, a touch sensor detecting a touch input, and a microphone detecting a voice input.

Next, the driving record transmission device 100-1 may include a terminal 600, a blockchain network system 10, and a communication unit 120 that communicates wirelessly with the traffic communication facility 200.

More specifically, the communication unit 120 may transmit the driving record information directly or through relaying via other communication device to the blockchain network system 10. Also, the communication unit 120 may receive the driving record information from the blockchain network system 10 through wireless communication.

Also, the communication unit 120 may collect communication information through wireless communication to execute the driving function. And, at least part of the communication information may be used for executing the driving function and may be included in the driving record information.

More specifically, the communication unit 120 may receive at least one information among location information, weather information, and traffic condition information on the road (for example, Transport Protocol Expert Group (TPEG)) from a mobile terminal 600, external server and/or traffic communication facility 200.

Also, the communication unit 120 may receive traffic information from the traffic communication facility 200 equipped with the Intelligent Transportation System (ITS). Here, the traffic information may include, for example, but not limited to, traffic signal information, lane information, vehicle surrounding information, or location information.

Also, the communication unit 120 may transmit navigation information from the traffic communication facility 200 and/or mobile terminal 600. Here, the navigation information may include, for instance, but not limited to, at least one or more pieces of information among map information related to vehicle driving, lane information, location information of the vehicle 100, and configured destination information and path information according to the destination.

For example, the communication unit 120 may receive real-time location of the vehicle 100 as the navigation information. More specifically, the communication unit 120 may include a Global Positioning System (GPS) module and/or Wireless Fidelity (WiFi) module to obtain the location of the vehicle 100.

Also, the communication unit 120 may share vehicle-to-vehicle driving information. For example, the communication unit 120 of the vehicle 100 may receive driving information of another nearby vehicle 101 from the other nearby vehicle 101 and transmit information of the present vehicle 100 to the other vehicle 101. Here, the information shared between the vehicles may include at least one or more pieces of information among driving direction information, location information, vehicle speed information, vehicle acceleration information, driving path information, forward/backward driving information, nearby vehicle information of the vehicle 100, and turn signal information.

And, the communication information received as described above may be included in the driving record information. For example, the vehicle location at the time of activating the driving function obtained through the communication unit 120 may be included in the driving record information.

The communication unit 120 may exchange data wirelessly with the other nearby vehicle 101, mobile terminal 600, blockchain network system 10, or traffic communication facility 200.

More specifically, the communication unit 120 may communicate wirelessly by using a wireless data communication method. For wireless data communication, technology standards for mobile communication may be used. Also, the communication unit 120 may utilize the wireless Internet technology. For example, Wireless LAN (WLAN), Wireless Fidelity (WiFi), WiFi Direct, Long Term Evolution (LTE), Long Term Evolution-Advanced (LTE-A), and so on may be used as the wireless Internet technology. Also, the communication unit 120 may utilize short range communication. For example, short range communication may be supported by using at least one of the Bluetooth™, Radio Frequency Identification (RFID), Infrared Data Association (IrDA), Ultra Wideband (UWB), and ZigBee technologies.

Also, the driving record transmission device 100-1 may be paired with a mobile terminal 600 located inside the vehicle by using a short range communication method and may exchange data wirelessly with the other nearby vehicle 101 or traffic communication facility 200 by using a long range wireless communication module of the mobile terminal 600.

Next, the driving record transmission device 100-1 may include an interface unit 130 that transmits and receives data in a wired/wireless manner to and from the vehicle controller 770, sensor unit 760 and/or any external device.

More specifically, the interface unit 130 may receive driving record information-related data through wired/wireless data communication with the vehicle controller 770, sensor unit 760 or separate driving function providing device.

For example, the driving record transmission device 100-1 may receive, through the interface unit 130, driving control information from the vehicle controller 770 and/or sensor information from the sensor unit 760.

To this end, the interface unit 130 may receive the sensor information and driving control information by performing data communication with the vehicle controller 770, driving function providing device, and sensor unit 760 inside the vehicle 100 through wired communication and/or wireless communication.

Here, the sensor information may include one or more pieces of information among driving direction information, location information, vehicle speed information, acceleration information, inclination information, forward/backward driving information, fuel information, distance information with respect to a front and rear vehicles 100, distance information between the vehicle 100 and lane of the vehicle 100; and turn signal information.

Also, the sensor information may be obtained from a heading sensor, yaw sensor, gyro sensor, position module, vehicle forward/backward sensor, wheel sensor, vehicle speed sensor, vehicle inclination detection sensor, battery sensor, fuel sensor, tire sensor, steering sensor due to rotation of the handle, vehicle internal temperature sensor, vehicle internal humidity sensor, collision detection sensor, and so on. Meanwhile, the position module may include a GPS module for receiving GPS information. For example, the vehicle location at the time of activating the driving function obtained through the position module may be included in the driving record information.

The driving control information may include transmission gear position, acceleration pedal position, steering wheel angle, and brake pedal position. Whether each driving control information has been generated by automatic control or manual control of the vehicle 100 may be distinguished.

More specifically, the sensor unit 760 of the vehicle 100 may include an external sensor that detects an external object. For example, the external sensor may include at least one of a distance sensor that detects the position of an object located in the surroundings of the vehicle 100 and a camera that captures the surroundings of the vehicle 100 and obtains an image thereof.

First, the distance sensor may detect the position of an object, orientation of the object with respect to the vehicle 100, distance of the object from the vehicle 100, or movement direction of the object. The distance sensor continuously or periodically measures the position of a detected object and accurately detects the change of the position of the object with respect to the present vehicle 100.

The distance sensor may detect an object located at at least one of the areas of front, rear, left, and right sides of the vehicle 100. To this end, the distance sensor may be disposed at various positions of the vehicle 100.

The distance sensor may include at least one or more of various distance measurement sensors such as a lidar sensor, laser sensor, ultrasonic sensor, and stereo camera.

Meanwhile, specific information about an external object may be obtained from analysis of an image captured by the camera. For example, the processor 170 may perform the analysis of the image.

More specifically, the driving record transmission device 100-1 may capture an image of the surroundings of the vehicle 100 by using the camera, detect objects in the vicinity of the vehicle 100, where the image of the surroundings of the vehicle is analyzed by the processor 170, determine the attributes of detected objects, and generate sensor information.

Here, image information may be included in the sensor information and may include at least one of information among an object type, traffic signal information represented by the object, a distance between the object and the vehicle 100, and a location of the object.

More specifically, the processor 170 may generate the image information by performing object analysis such as detection of an object from the image captured through image processing, object tracking, measurement of the distance to the object, and identification of the object.

One or more image capturing devices such as a camera may be installed at various positions. More specifically, a plurality of cameras may be disposed respectively at at least one or more positions among left, rear, right, front side, and ceilings of the vehicle 100.

The camera may include an image sensor and image processing module inside the camera. The camera may process a still image or video obtained from the image sensor (for example, Complementary Metal-Oxide-Semiconductor (CMOS) or a Charged-Coupled Device (CCD)). Also, the image processing module may process the still image or video obtained through the image sensor, extract necessary image information, and provide the extracted image information to the processor 170.

In some embodiments of the present disclosure, in order for the processor 170 to perform object analysis more effectively, rapidly or conveniently, the camera may be implemented as a stereo camera that not only captures an image but also measures the distance to an object.

The sensor unit 760 may be, for example, but not limited to, a stereo camera which can perform the combined functions of a distance sensor and a camera. In other words, the stereo camera may be configured to detect an image as well as the position relationship with respect to an object at the same time.

The interface unit 130 may receive data related to the driving record information from external devices installed in the vehicle 100, such as a driving function providing device or other navigation device.

The interface unit 130 may perform data communication by being connected to a wired/wireless communication port or by being connected to another unit directly or indirectly.

Next, the memory 140 may store various data for the overall operation of the driving record transmission device 100-1, such as a program for processing or control by the processor 170.

More specifically, the memory 140 may store driving record information generated in real-time. The stored driving record information may be deleted after a predetermined time period but may be retained at the occurrence of an event.

And the memory 140 may store various data for the overall operation of the driving record transmission device 100-1, such as a program for processing or control performed by the processor 170.

Also, the memory 140 may store a plurality of application programs (or applications) run in the driving record transmission device 100-1, data for the operation of the driving record transmission device 100-1, and commands. At least part of the application programs may be pre-installed in the driving record transmission device 100-1 during the manufacturing process or at the time of factory release to provide basic functions of the driving record transmission device 100-1. And, the application programs may be stored in the memory 140 and executed to perform the operation (or function) of the driving record transmission device 100-1 by the processor 170.

The memory 140, in hardware, may include, for example, but not limited to, at least one type of storage medium among flash memory type, hard disk type, Solid State Disk (SSD) type, Silicon Disk Drive (SDD) type, multimedia card micro type, card-type memory (for example, SD or XD memory), Random Access Memory (RAM), Static Random Access Memory (SRAM), Real-Only Memory (ROM), Electrically Erasable Programmable Read-Only Memory (EEPROM), Programmable Read-Only Memory (PROM), magnetic memory, magnetic disk, and optical disk.

Also, the driving record transmission device 100-1 may operate in conjunction with a web storage that performs a storage function of the memory 140 on the Internet or over the network.

Next, the monitoring unit 195 may obtain information about the vehicle internal condition.

Part of the vehicle internal condition information may be included in the driving record information. The information detected by the monitoring unit 195 may include at least one or more pieces of information among a driver image, face recognition information, fingerprint information, iris-scan information, retina-scan information, hand geometry information, and voice recognition information. And, the monitoring unit 195 may include one or more sensors sensing biometric recognition information.

Next, the driving record transmission device 100-1 may further include the sensor unit 760 that detects objects in the surroundings of the vehicle 100. The driving record transmission device 100-1 may detect nearby objects by utilizing the sensor unit 760 or receive sensor information obtained from the sensor unit 760 of the vehicle 100 through the interface unit 130. Alternatively, the sensor unit 760 may be an element separate from the vehicle 100 or may be included in the driving record transmission device 100-1. The sensor information obtained above may be included in the vehicle surrounding information.

Next, the driving record transmission device 100-1 may further include the display unit 180 that displays information such as a graphic image about the driving record information storage/management function.

The display unit 180 may further include a plurality of displays.

More specifically, the display unit 180 may include a first display unit that displays a graphic image by projecting the graphic image on the windshield of the vehicle 100. In other words, the first display unit may comprise a Head Up Display (HUD) and may include a projection module that projects a graphic image on the windshield. And, the graphic image projected by the projection module may have a particular degree of transparency. Therefore, the user may see the graphic image and the scene behind the graphic image at the same time.

Meanwhile, the display unit 180 may include a second display unit that is installed separately inside the vehicle 100 and displays an image about the vehicle driving assistance function.

More specifically, the second display unit may be a display of a vehicle navigation device or a front cluster inside the vehicle 100.

Also, the second display unit may include at least one of Liquid Crystal Display (LCD), Thin Film Transistor-Liquid Crystal Display (TFT LCD), Organic Light-Emitting Diode (OLED), flexible display, 3D display, and e-ink display.

The second display unit may be implemented as a touchscreen having a touch input unit.

Next, the audio output unit 185 may output information such as a description about the function of the driving record transmission device 100-1 or a message for confirming execution as an audio output. In other words, the driving record transmission device 100-1 may output or complement the descriptions about the function of the driving record transmission device 100-1 through an audio output of the audio output unit 185 together with a visual display through the display unit 180.

Also, the power supply unit 190 may receive external and/or internal power according to the control of the processor 170 and supply power necessary for the operation of individual constituting elements associated with the vehicle 100.

The driving record transmission device 100-1 may include the processor 170 that controls the overall operation of each unit within the driving record transmission device 100-1.

Also, to operate application programs, the processor 170 may control at least part of the constituting elements described with reference to FIG. 3. Furthermore, to operate the application program, the processor 170 may make associating or combining at least two or more of the constituting elements belonging to the driving record transmission device 100-1.

The processor, with respect to hardware implementation, may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for executing other functions.

And the processor 170 may be controlled by the controller 770 or control various functions of the vehicle 100 through the controller 770.

Besides the operation related to the application programs stored in the memory 140, the processor 170 typically controls the overall operation of the driving record transmission device 100-1. The processor 170 may provide or process information or a function suitable for the user by processing a signal, data, or information input or output through the constituting elements described above or by executing application programs stored in the memory 140.

An audio and video navigation (AVN) 400 may be connected to the driving record transmission device 100-1.

Traffic Communication Facility, System or Device 200

Meanwhile, the traffic communication facility, system or device 200 may provide optimal traffic efficiency through interworking with the ITS.

More specifically, the traffic communication facility 200, installed in the vicinity of the road on which the vehicle 100 drives, may provide traffic-related information through wireless communication with vehicle 100 and control road signal facilities such as traffic lights or electronic signage installed in the vicinity of the road.

Also, the traffic communication facility 200 may provide or associate with an intelligent transportation system (infrastructure), through wireless communication, with information needed when the vehicle 100 drives autonomously or when the vehicle 100 provides a driving assistance function.

T plurality of the traffic communication facilities 200 may be installed, spaced with each other along the road and connected to the vehicle 100 continuously (Vehicle-to-Infrastructure (V2I)) to transmit and receive necessary information to and from the vehicle 100.

Figure 4:
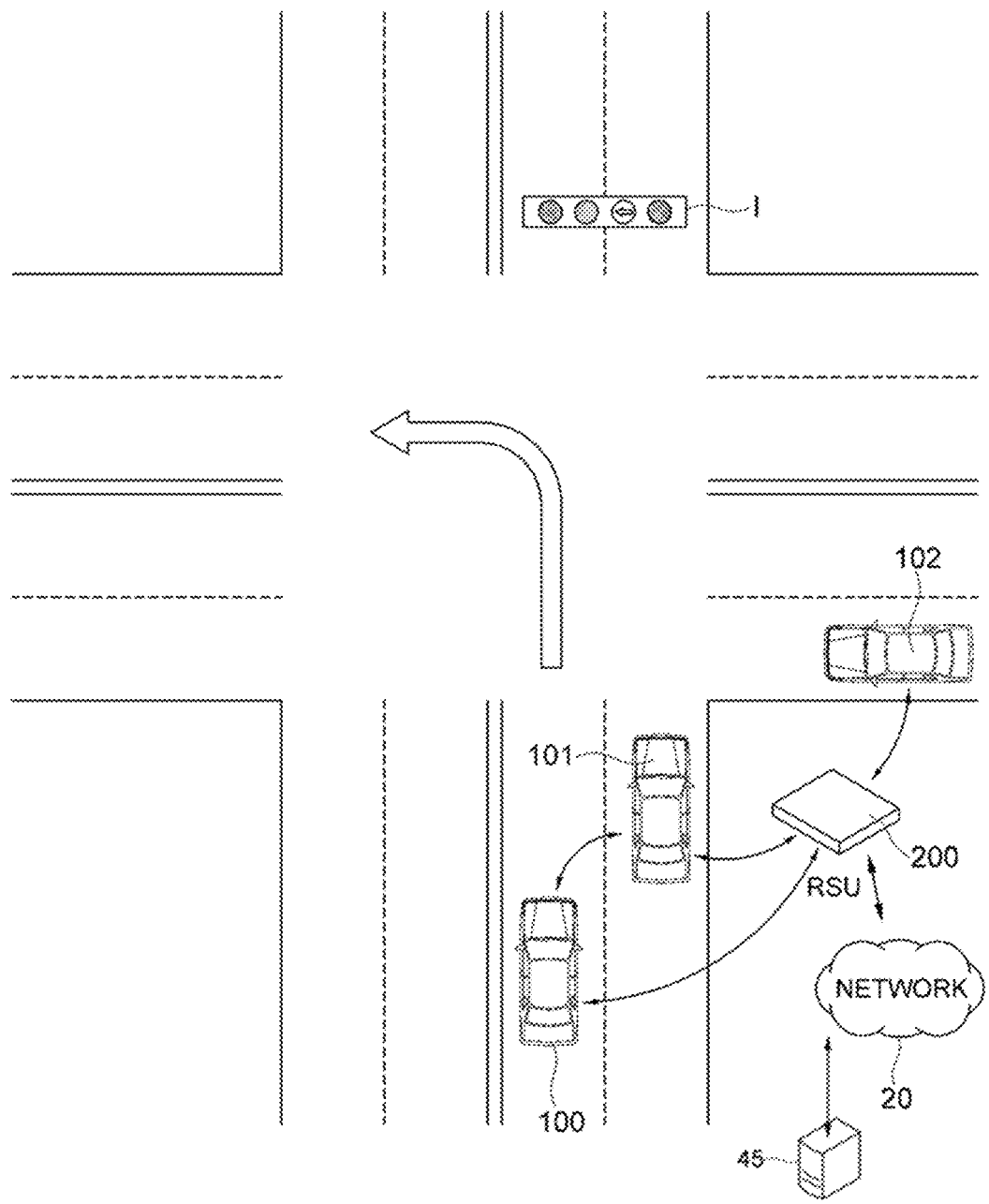
FIG. 4 illustrates a conceptual diagram showing communication flows between a roadside infrastructure and vehicles according to an embodiment of the present disclosure.

More specifically, referring to FIG. 4, the traffic communication facility 200 may comprise a Road Side Unit (RSU) installed in the vicinity of the road such as the crossroad, recognize driving status of vehicles 100-102 through communication with nearby vehicles 100-102, determine a driving order among the recognized vehicles 100-102, transmit the determined order to the vehicles 100-102, and thereby assist smooth crossroad driving of the vehicles 100-102.

Also, the traffic communication facility 200 may control traffic signal equipment I based on the driving status information among the recognized vehicles 100-102.

The traffic communication facility 200 is capable of data communication not only with the vehicles 100-102 but also with an external server 45, network 20 such as the Internet and/or blockchain network system 10 and may relay the information received from the vehicle 100.

In other words, when an event occurs while the vehicle 100 transmits the driving record information and/or when the vehicle 100 transmits the driving record information according to the occurrence of the event, the traffic communication facility 200 may transmit the received driving record information through a public network or directly to the blockchain network system 10.

According to some embodiments of the present disclosure, the traffic communication facility 200 may include an ordinary communication facility for communication relay. For example, the traffic communication facility 200 may include a communication facility that wirelessly relays data of a terminal such as a nearby smartphone.

Other Vehicle 101

Meanwhile, in order for the driving function to be executed, the vehicle 100 may need wireless communication with other vehicles 101-102 (Vehicle-to-vehicle, V2V).

More specifically, the vehicle 100 may share driving information with other vehicles 101-102 by receiving driving information of other nearby vehicles 101-102 from the other nearby vehicles 101-102 and transmitting information of the present vehicle 100 to the other nearby vehicles 101-102, and utilize the driving information for autonomous navigation or driving assistance function. Also, the driving information received from the other vehicles 101-102 may be included in the driving record information.

Therefore, the vehicle 100 according to the embodiment of the present disclosure may continuously or periodically maintain a wireless connection state for transmitting and receiving data to and from the other vehicles 101-102. And when an event occurs while the vehicle 100 is transmitting driving record information and/or when the vehicle 100 transmits driving record information according to the occurrence of the event, the other vehicle 101 and/or 102 may transmit received driving record information through a public network or directly to the blockchain network system 10.

Blockchain Network System 10

Figure 5:
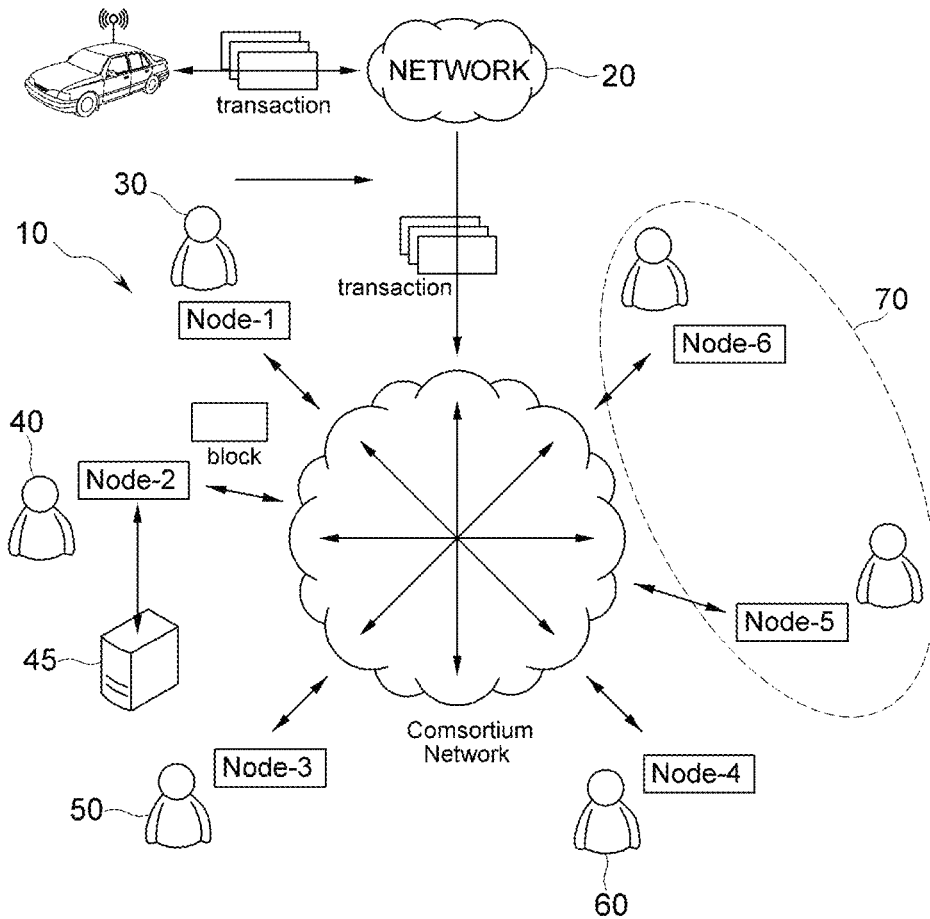
FIG. 5 illustrates a blockchain network system according to an embodiment of the present disclosure.

Referring to FIG. 5, a consortium network-based blockchain network system 10 may receive driving record information through a network, for example, but not limited to, an open network 20 such as the Internet from the vehicle 100, other vehicles 101-102, and/or traffic communication facility 200.

More specifically, the blockchain network system 10 may store driving record information standardized according to one or more predetermined rules as transaction data, store the driving record information in a distributed data storage environment in the form of chains created through a peer-to-peer (P2P) scheme, and thereby prevent forgery or falsification of the driving record information in advance.

The blockchain network system 10 may be built on the peer-to-peer network architecture on the network. According to some embodiments of the present disclosure, users using or participating in the system 10 are all given equal positions, no special node is designated in the network, and all of the nodes (node 1 to node n) share the role of providing a network service.

And, various nodes on the network form topologies equivalent to each other and are interconnected in a mesh network. Even if nodes belonging to the network are at the positions equal to each other, their roles may differ from each other depending on the function supported by the nodes.

In another embodiment, at least one node of the blockchain network system 10 may have the position of a main manger, and the remaining nodes may perform the role of monitoring the main manger node.

Each node is equipped with a routing function within the network and may be equipped with other function. Each node may validate and propagate transactions and blocks and perform the role of maintaining a connection to neighboring nodes.

The blockchain network system 10 according to the embodiment of the present invention may be a consortium blockchain. In other words, nodes of the blockchain network system 10 may correspond only to the server 45 or terminal of authorized organizations, security may be configured so that blocks are shared only among the corresponding nodes, and thereby driving record information may be prevented from being exposed to the outside. In other words, the network of the blockchain network system 10 may include a private network such as the Intranet.

However, each node may be connected to a public network such as the Internet independently of a consortium network, receive driving record information through the public network, store the received driving record information as transaction data, and transmit the transaction data from a private network.

As described above, the driving record information may not be open to an unauthorized person or entity because the driving record information has a risk that the driver's privacy may be infringed and the technology of a vehicle manufacturer 30 and/or driving function service provider may be exposed.

On the other hand, since the driving record information is important information for determining liability for occurrence of an event among a driver, the vehicle manufacturer 30, a driving function service provider, and a third party, it may be necessary, depending on the needs, to retrieve the driving record information while security is maintained.

To this end, main users 30, 40, 50, 60 capable of participating in the consortium blockchain network system 10 may include a vehicle manufacturer 30, driving function service provider 40, and public institution 50.

Here, the public institution 50 may be an institution that monitors collusion of vehicle manufacturers 30 and driving function service providers 40, and monitors the blockchain network system 10 to operate fairly.

In addition, sub-users 70 may include an emergency rescue agency, hospital, vehicle repair shop, or insurance company that may use the driving record information efficiently as a third party, and may be authorized to view the driving record information if needed.

The sub-user may be authorized to download a specific blockchain depending on situations. The sub-user may receive the digital signature of the main user and browse transaction data, if needed, to check the driving record information.

For example, an emergency rescue agency may determine severity of an accident by checking the driving record information before the dispatch and perform an efficient emergency rescue according to the severity of the accident.

In other words, nodes connected to the network may have main user nodes and sub-user nodes.

However, nodes operating special protocols may also be included in the network, and protocol gateways that connect the nodes operating other protocols may also be included therein.

Figure 6:
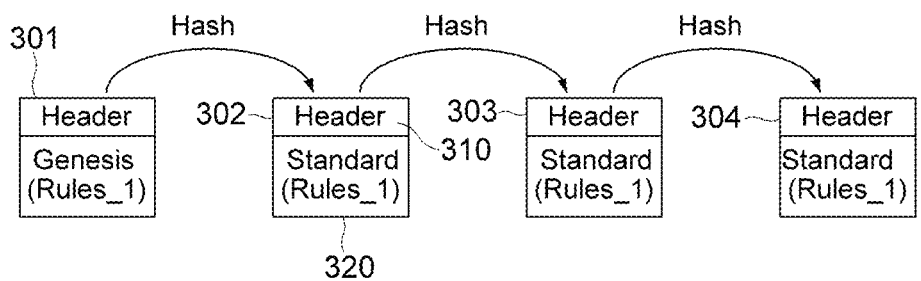
FIG. 6 illustrates a blockchain according to an embodiment of the present disclosure.

Referring to FIG. 6, a blockchain is realized by a distributed computer system comprising unalterable blocks containing transaction data (for example, driving record information due to occurrence of an event). Since each block 301, 302, 303, 304 comprising the blockchain contains a hash of its previous block header, blocks are concatenated together and generate records of all of the transaction data initially written to the blockchain. Since a block is tied to previous blocks, disassembly, modification, and reconfiguration of the records may be almost impossible. Further, because each node owns a block, blocks may be made to be distributed and robust, which makes forgery and falsification of transactions approved for blocks nearly impossible.

Here, the hash implies a function that maps arbitrary data of an arbitrary length onto data of a fixed length, and the hash may encompass various functions (for example, an elliptic curve multiplication function) showing the same characteristics as hashes.

In the embodiment, one block records at least one transaction data. And, the transaction data may be mapped to a hash value to prevent forgery or falsification. Also, by additionally managing the hash value for connection to the other block and the timestamp at the time of data generation, forgery and falsification may be prevented, and a history of event occurrences may be tracked.

Also, nodes store a blockchain ledger and wallet application that keeps a digital key, by which a user may secure/browse transaction data within the consortium blockchain in a safe and reliable manner.

Also, nodes may provide a blockchain explorer. The blockchain explorer may be implemented as a web application that performs the role of a search engine for searching for driving record information.

The user who owns a wallet that keeps a digital key for the corresponding driving record information may look up the address of the driving record information, transaction data, or blocks through the blockchain explorer, and figure out the relationship and flow among them.

Each node may include a server 45, interface, system, database, agent, peer, engine, controller, or other type of computing device operating individually or in a group or may be constructed in an appropriate combination of computing devices so as to read all kinds of computing languages. A computing device may include a processor configured to execute software commands stored in a non-volatile computer-readable storage medium (for example, a hard drive, solid state drive, RAM, flash, and ROM).

Preferably, software commands are organized so that a computing device may provide various functions described later. Also, the disclosed techniques may be implemented as a computer program product which includes a non-volatile computer-readable medium storing software commands used by the processor to execute disclosed steps.

Preferably, various servers, systems, databases, and interfaces may exchange data by using HTTP, HTTPS, AES, public/private key exchange, web service, API, financial transaction protocol known to the public, or other electronic standard protocol or algorithm. Preferably, data exchange may be performed through a packet exchange network, Internet, LAN, WAN, VPN, or other type of packet exchange network.

Also, at least part of computing devices denoted by the respective nodes may provide a platform by which a user may browse driving record information within a hosted blockchain.

In some embodiments, the platform may be a web-based platform that may be accessed through the public network by a computing device operated by the main user such as a vehicle manufacturer 30, public institution 50, or driving function service provider 40.

When a third party, such as a driver or insurance company, attempts to read driving record, the platform may provide a web page that provides an interface function by which the third party may search for the driving record information and read the driving record information under the approval of nodes.

For example, if the driver accesses the web page of the manufacturer of the driver's accident vehicle 100, enters the vehicle identification number, and performs driver authentication to check accident records of the driver, the vehicle manufacturer 30 may search for the location of transactions based on the vehicle identification number and provide, to the driver, at least part of driving record information obtained by digitally signing the transaction data.

Meanwhile, a node which has first received the transaction data may inform the consortium network that the corresponding transaction data has been received. Since distribution of the transaction data is performed through the P2P protocol, the corresponding transaction is transferred quickly to the network, and most of the nodes connected to the network will receive the transaction details within a few seconds.

If a transaction is transmitted to one node connected to the network, the transaction is validated at the corresponding node. After the transaction is validated, the transaction may be propagated to other nodes connected to the corresponding node.

Meanwhile, individual nodes that have received the transaction may verify the validity of the corresponding transaction through the validity verification algorithm or step. For example, each node may verify the validity of the transaction by verifying whether syntax and data structure of the corresponding transaction have been converted according to the standard rules specified by the consortium blockchain network system 10 and which of the main users are connected to the corresponding transaction data.

The transactions validity of which has been verified are propagated on the network, but invalid transactions may be discarded, for example, at the first node to which the invalid transactions have been transmitted.

Therefore, transaction data transmitted to the nodes is kept to the unconfirmed state for at least a predetermined time period. This is because, although the corresponding transaction has been transferred to the network, the transaction may have not been written to the ledger called a blockchain. Therefore, if a new block is generated and connected to the blockchain after transaction data is generated due to occurrence of an event, the transaction data in the generated block are approved in the confirmed state on the network.

Nodes on the consortium network may store unconfirmed transaction data into a memory pool or transaction pool before block creation as a temporary list. By using the pool, nodes may track those transactions known to the network but not included in a blockchain yet.

Afterwards, the transaction data stored in the temporary list of the node may be included in a newly generated block at the time of creation of the new block.

Figure 7:
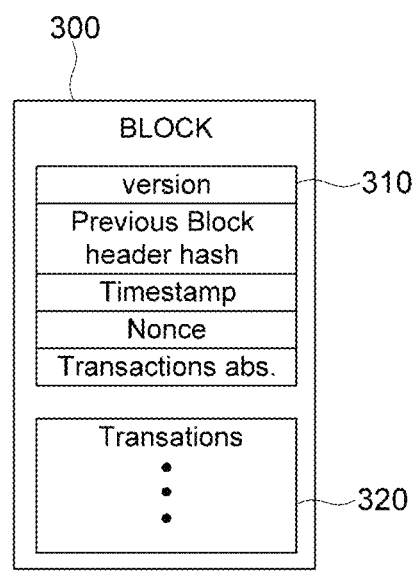
FIG. 7 illustrates a structure of a block according to an embodiment of the present disclosure.

Referring to FIGS. 6 and 7, a block 300 according to an embodiment of the present disclosure may include a block header 310 comprising one or more data of a version, hash of a previous block header, timestamp at the time of data creation, transactions abstract of transaction data, and nonce.

More specifically, the block header 310 is connected to a previous block by including a hash of the previous block header 310, timestamp at the time of data creation, and abstract of transaction data (in what follows, transaction abstract) to protect the transaction data of the previous block from forgery and falsification.

Here, the transaction abstract indicates abstract data obtained by combining all of transaction data to be included in the block 300 by using, for example, but not limited to, the Merkle tree function. Through the transaction abstract, the nodes may search for specific transaction data to determine in which block 300 the specific transaction data is contained.

Also, the block header 310 may help analyze the corresponding block 300 by further including the program version, and if the block 300 is generated in the form of mining, a nonce may be further included.

And, transaction data stored in the memory pool from the time of creation of the previous block 300 to the time of creation of the corresponding block 300 may be stored in the body 320 of the block 300.

In the embodiment, the transaction data may be data converted from the driving record information.

Figure 8:
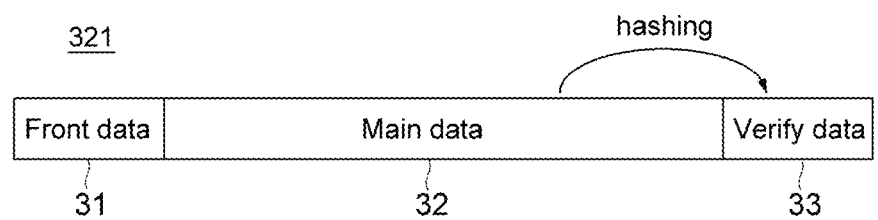
FIG. 8 illustrates a structure of transaction data according to an embodiment of the present disclosure.

For example, referring to FIG. 8, transaction data according to one embodiment may comprise front data 31, main data 32, and verification data 33.

The front data 31 may include at least one of a driving function service provider index, vehicle manufacturer index, vehicle index, and driver index.

The front data 31 may include an index for identifying the vehicle 100 and provide the vehicle index so that driving record information of the vehicle 100 may be retrieved afterwards through the vehicle index.

Also, the front data 31 may include an index of the driving function service provider 40 of FIG. 5 and/or an index of the vehicle manufacturer 30 of FIG. 5 and check afterwards who is authorized to view encrypted (for example, hashed) transaction data.

In other words, the front data 31 may include the index of the driving function service provider 40 and/or the index of the vehicle manufacturer 30 so that it may be checked who owns a digital key for converting the hashed transaction data to the driving record information.

Also, information such as the driver index or time of event occurrence may be added to the front data 31 to help retrieve the driving record information.

Meanwhile, the main data 32 may include the driving record information.

More specifically, the driving record information may be stored in the main data 32, to be arranged according to the standard format.

Also, a hash value that maps the driving record information arranged according to the standard format may be stored in the main data 32.

In other words, if driving record information is transmitted via other vehicle 101, traffic communication facility 200, and public network, the driving record information may be leaked to the outside such as an unauthorized person or entity, and therefore, a hash value that encrypts the driving record information may be stored in the main data 32.

The transaction data may further include verification data 33.

The verification data 33 may be used for checking whether the main data 32 has been arranged according to the standard rules, whether a hash function has been applied properly, and whether the front data 31 has been organized correctly.

If the main data 32 has been hashed without following the standard rules, the verification data 33 may be used to detect the violation and indicate that the transaction data is in the invalid state.

Embodiment in View of Vehicle 100

A process for storing driving record information on a blockchain by the blockchain based driving record data storage system comprising the elements described above will be described in detail from the viewpoint of a vehicle 100.

For the convenience of descriptions, the driving record transmission device 100-1 will be referred to as the vehicle 100.

Figure 9:
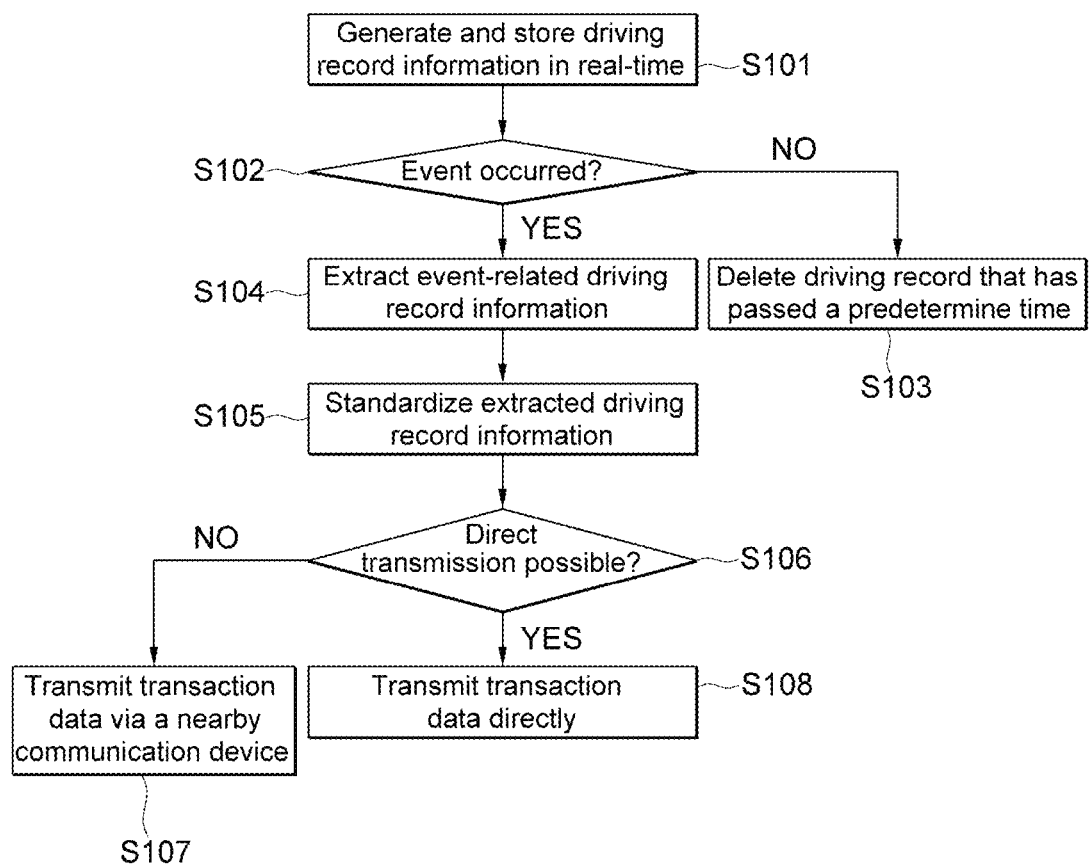
FIG. 9 is a flow diagram illustrating a process for transmitting transaction data to a blockchain network system by a driving record transmission device according to an embodiment of the present disclosure.

Referring to FIG. 9, the vehicle 100 may first generate and store driving record information in real-time (S101).

<Driving Record Information>

Here, the driving record information may be used for determining who or which vehicle is liable for the occurrence of an event, which may include information required for providing a driving function and/or driver's driving information. The driving record information may be a concept where the occurrence of the event may indicate not only the moment at which the event occurs but also the time period before and after the occurrence of the event.

In another aspect, the driving record information may be information which records data generated as the vehicle 100 drives along, including information obtained for automatic control of the vehicle 100, automatic control information based on the aforementioned information, and even the information about the change of the vehicle 100 due to the automatic control.

And when viewed with respect to the attribute of information, the driving record information may include at least one or more of status information of the vehicle 100, driving control information, vehicle surrounding information and/or vehicle condition information.

Here, the vehicle status information represents the driving condition of the vehicle 100 at the occurrence of an event, including at least one or more pieces of information among speed of the vehicle 100, speed change of the vehicle 100, driving direction, driving direction change engine revolutions per minute (RPM), crash severity of collision, tire status, and airbag deployment data. The vehicle status information may be used as one of important information for determining liability at the occurrence of the event among the vehicle manufacturer 30, vehicle repair shop, and driving function service provider 40.

Also, the driving control information may include transmission gear position, acceleration pedal position, steering wheel angle, and brake pedal position. Also, each driving control information may be divided into information related to the situation where a controller controls a driving unit by using autonomous navigation or driving assistance function, or information related to the situation where the driver manually controls the driving unit by using a driving means. The driving control information may be one of important information for determining liability for occurrence of the event among the vehicle manufacturer 30, driving function service provider 40, and driver.

Also, the vehicle surround information may include location information, object image, object distance information, vehicle internal information, and communication information. The vehicle surround information may be one of important information for determining liability among external third party, vehicle manufacturer 30, vehicle repair shop, and driving function service provider 40.

Also, when viewed with respect to an information acquisition unit, the driving record information may include internal sensor information, external sensor information, driving control information, or communication information.

The driving record information may be converted to a standard form according to the rules based on the agreement among main users before encrypted and converted to encrypted transaction data.

Back to the descriptions about the embodiment, the vehicle 100 may store, in real-time, the driving record information generated as the vehicle drives along. At this time, the vehicle 100 may maintain a communication state with an external traffic communication facility 200 or another vehicle 101, or transmit the driving record information generated in real-time.

In an embodiment, the driving record information refers to information before it is converted to transaction data. However, in another embodiment, the driving record information may be converted into transaction information irrespective of occurrence of an event, and the transaction information may be transmitted and received so that the driving record information may be transmitted immediately without involving a separate conversion process at the occurrence of the event.

Next, the vehicle 100 may detect occurrence of an event while it is driving along (S102).

Here, the event refers to the occurrence of an accident, user request, and/or system failure, which may be detected through vehicle sensors or user input.

If the occurrence of the event is not detected at S102, the vehicle 100 may delete a driving record that has passed a predetermined time, thereby improving a data processing and storage efficiency (S103).

If the event occurs at S102, the vehicle 100 may extract driving record information related to the occurred event (S104).

More specifically, the vehicle 100 may extract not only the driving record information at the occurrence of the event but also the driving record information before and after the occurrence of the event as the driving record information to be stored.

For example, the vehicle 100 may store the driving record information from a predetermined time before the occurrence of the event to a predetermined time after the occurrence of the event and provide the stored driving record information so that the cause of the event may be clearly identified later.

Next, the vehicle 100 may convert the extracted driving record information to transaction data (S105).

At S105, a rule for converting the driving record information to the transaction data may be a standard rule, which has been predefined among main users of the consortium network according to an agreement.

The standard rule may be embedded in the vehicle 100 by default, and the driving record information may be converted to the transaction data according to the standard rule at the occurrence of an event.

More specifically, the vehicle 100 may arrange at least part of data among driving record information according to the standard rule.

Here, the driving record information contained in the front data 31 of the transaction data may include, in the form open to be analyzed by a third party, at least one of a index of the driving function service provider 40 of FIG. 5, a index of the vehicle manufacturer 30, a vehicle index, and a driver index.

Next, the vehicle 100 may configure the main data 32 in the form of encryption by encrypting privacy information (for example, hash) that may be problematic for a driver, vehicle manufacturer 30, and service provider 40 for which technology leakage may be critical. For example, vehicle status information, driving control information, and vehicle surround information, which are accident-related information, may be stored as the encrypted main data 32.

In other words, at least part of driving record information may be configured in an open form while the remaining information may be configured as encrypted data, which together form the transaction data.

Lastly, the vehicle 100 may calculate a hash value while the front data 31 and the main data 32 are combined and generate the verify data 33 by which the main data 32 verifies an encryption state to check whether the front data 31 is properly arranged according to the standard rule or whether the main data 32 is properly arranged according to the standard rule.

More specifically, the vehicle 100 may check validity of data through a hashsum which is a sum of hash values of the front data 31 and main data 32.

In other words, the vehicle 100 may not be able to convert driving record information to valid transaction data because of the impact from occurrence of an event, and the time of occurrence may be confirmed and dealt with through the verification data 33.

The vehicle 100 which has obtained the transaction data may transmit the transaction data directly or indirectly to the blockchain network system 10 (S106).

More specifically, when the communication unit is in a normal operation and may be assessed directly, the vehicle 100 may transmit the transaction data directly to at least one of the blockchain network system 10 (S108).

More specifically, the vehicle 100 may be connected to the public network through the communication unit and transmit the transaction data to at least one node connected to the public network.

At this time, it may be preferable that to prevent in advance forgery or falsification from being performed, one node may not be the vehicle manufacturer 30 of the vehicle 100 or the service provider 40.

Meanwhile, when the communication unit reveals an error or has a difficulty in accessing the public network, the vehicle 100 may transmit the transaction data to a nearby traffic communication facility 200 or another vehicle 101 (S107).

Figure 10:
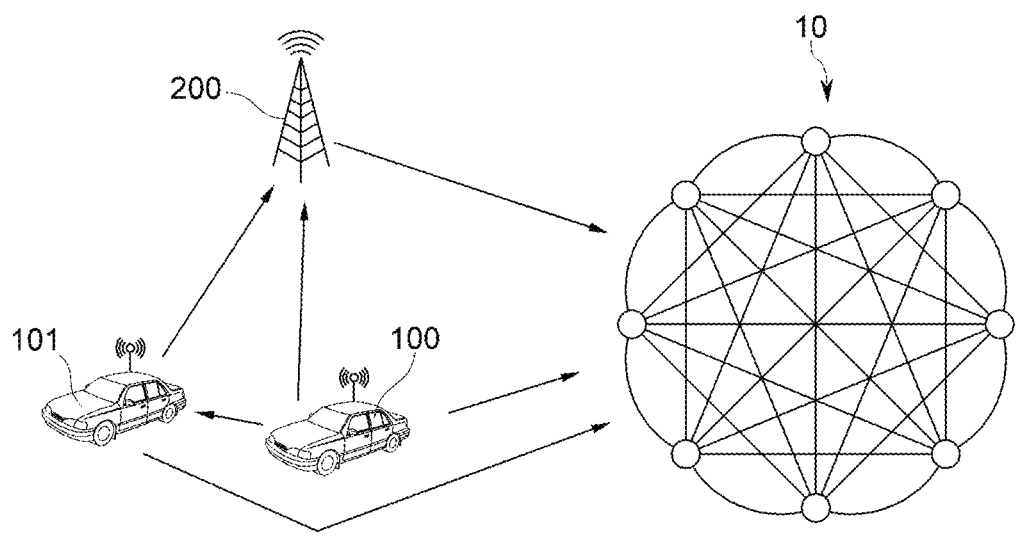
FIG. 10 illustrates various routes through which transaction data are transmitted to a blockchain network system by a driving record transmission device according to an embodiment of the present disclosure.

Referring to FIG. 10, the vehicle 100 may transmit transaction data directly to a blockchain network, transmit the transaction data to the blockchain network indirectly via the traffic communication facility 200, and/or transmit the transaction data to the blockchain network indirectly via the other vehicle 101.

As described above, to provide a driving function, the vehicle 100 may exchange data wirelessly by being continuously or periodically connected to the nearby traffic communication facility 200 or the other vehicle 101.

Therefore, if it is found that direct transmission is difficult in the occurrence of an event, the vehicle 100 may transmit the transaction data before an impact on the vehicle 100 due to the occurrence of the event by transmitting the transaction data quickly to a pre-connected traffic communication facility 200 or the other vehicle 101 with which has been already connected over a wireless network.

At this time, even if the transaction data is transmitted via a third party and public network, since the main data 32 is in an encrypted state by the hash operation, it is still impossible or difficult to check or open the main data 32 unless a digital key owned by at least one user of the blockchain network system 10 is used, which may improve security.

Also, the vehicle 100 may transmit driving record information to the blockchain network quickly and correctly by detecting a plurality of communication facilities available, selecting one communication facility providing the best communication condition among the plurality of communication facilities, and transmitting transaction data to the selected communication facility. For instance, the communication facility providing the best communication condition may indicate the communication facility providing the relatively fastest data transfer speed.

To summarize, a method for storing driving record information or data based on a blockchain according to an embodiment of the present disclosure may be advantageous in that driving record information generated due to driving of a vehicle is stored and managed based on a blockchain, forgery and falsification of the driving record information can be prevented beforehand; and the cause of occurrence of an event is identified clearly.

Also, a method for storing driving record information or data based on a blockchain according to an embodiment of the present disclosure may securely protect privacy information included in the driving record information and improve technical security at the time of storing the driving record information so that proprietary techniques of a service provider and/or vehicle manufacture may be protected.

Additionally, a method for storing driving record information or data based on a blockchain according to an embodiment of the present disclosure may be advantageous in that a vehicle may transmit the driving record information to a blockchain network quickly and correctly at the occurrence of an accident.

Embodiment in View of Blockchain Network System

A process for storing and managing driving record information on a blockchain by a blockchain based driving record data storage system will be described in detail from the viewpoint of the blockchain network system 10.

Figure 11:
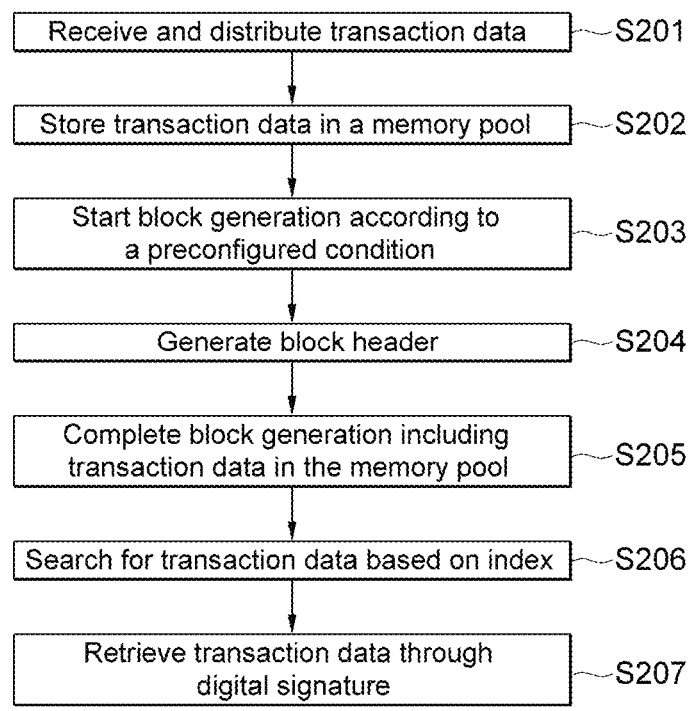
FIG. 11 is a flow diagram illustrating a process for generating a block in a blockchain network system and browsing driving record information in the generated block according to an embodiment of the present disclosure.

Referring to FIG. 11, the blockchain network system 10 may receive transaction data and distribute the received transaction data so that the received transaction data may be shared among nodes (S201).

In an exemplary embodiment, one node of the blockchain network system 10 may receive transaction data directly from the public network or vehicle 100, store the received transaction data in a memory pool, and transmit the stored transaction data to other nodes.

More specifically, a node which has first received the transaction data may inform the consortium network that the corresponding transaction data has been received. Since the distribution of the transaction data is performed through the P2P protocol, the corresponding transaction is transferred quickly to the network, and most of the nodes connected to the network may receive the transaction details within a few seconds.

And, individual nodes that have received the transaction data may verify the validity of the corresponding transaction through the validity verification step. For example, each node may verify the validity of the transaction data by verifying whether syntax and data structure of the corresponding transaction data have been converted according to the standard rules specified by the consortium blockchain network system 10 and which of the main users is connected to the corresponding transaction data.

Transaction data transmitted to the nodes is kept to the unconfirmed state for at least a predetermined time period. In other words, this is because, although the corresponding transaction has been transferred to the network, the transaction has not been written to the ledger called a blockchain. Therefore, if a new block is generated and connected to the blockchain after the transaction data is generated due to the occurrence of an event, the transaction data in the generated block are approved in the confirmed state on the network.

Nodes on the network which have received valid transaction data may store unconfirmed transaction data into a memory pool or transaction pool before the creation of the block 300 as a temporary list (S202).

By using the pool, nodes may track those transactions known to the network but not included in a blockchain yet.

Afterwards, the transaction data stored in the temporary list of the node may be included in a newly generated block 300 at the time of the creation of the new block 300.

Next, the blockchain network system 10 may generate a block 300 according to a preconfigured condition (S203).

More specifically, the blockchain network system 10, which is a consortium blockchain, may not have to perform mining. Therefore, if the preconfigured condition is satisfied, one node determined randomly may generate a block 300.

For example, if a predetermined time period is passed, the blockchain network system 10 may add a random time elapse smaller than the predetermined time period and have a preconfigured condition that one node selected randomly at the corresponding random time generates a block 300.

In another embodiment, the blockchain network system 10 may include a nonce in the latest block header 310, adjust the difficulty so that the nonce is solved within a predetermined time, and determine a condition that a node that has found the hash of the latest block header 310 by solving the nonce may generate a new block 300.

In yet another embodiment, the blockchain network system 10 may include a nonce in the latest block header 310, adjust the difficulty so that the nonce is solved within a predetermined time, designate a specific node to solve the corresponding nonce, and determine a condition that when the specific node solves the corresponding nonce, the corresponding node generates a new block 300.

If a generation right of a block 300 is given, the corresponding node may generate the block header 310 (S204).

Here, the block header 310 may include at least one or more data of a version, hash of a previous block header 310, timestamp at the time of data creation, transactions abstract of transaction data, and nonce.

More specifically, the block header 310 may include a hash of the previous block header 310, timestamp at the time of data creation, and abstract of transaction data (hereinafter "transaction abstract") to protect transaction data from forgery and falsification.

Here, the transaction abstract may indicate abstract data obtained by combining all of transaction data to be included in the block 300 by using, for example, but not limited to, the Merkle tree function. Through the transaction abstract, the nodes may search for specific transaction data to determine in which block 300 the specific transaction data is contained.

Also, the block header 310 may help analyze the corresponding block 300 by further including the program version, and if a block 300 is generated in the form of mining, a nonce may be further included.

Next, a node may include or add transaction data stored in or to a memory pool to complete the creation of the block 300 (S205).

More specifically, the transaction data stored in the memory pool from the time of creation of the previous block 300 to the time of creation of the corresponding block 300 may be stored in the body 320 of the block 300.

Meanwhile, at least part of driving record information included in the transaction data may be encrypted and therefore, may prevent authorized access and may not be checked.

Therefore, the blockchain network system 10 may provide an interface through which decryption may be performed to check or open driving record information.

First, the blockchain network system 10 may provide an index-based search engine interface that searches for transaction data including driving record information (S206).

In other words, at least part of nodes of the blockchain network system 10 may provide a blockchain explorer. The blockchain explorer may be implemented as a web application that performs the role of a search engine for searching for driving record information.

The blockchain explorer may be provided so that driving record information in question may be retrieved through the index (for example, vehicle index) included in the transaction data.

Also, at least part of computing devices denoted by the respective nodes may provide a platform by which a user may browse driving record information within a hosted blockchain.

In some embodiments, the platform may be a web-based platform that may be accessed through the public network by a computing device operated by the main user such as a vehicle manufacturer 30, public institution 50, or driving function service provider 40.

When a third party such as a driver or insurance company attempts to read driving record from the outside, the platform may provide a web page that provides an interface function by which the third party may search for the driving record information and read the driving record information under the approval of nodes.

For example, if the driver accesses the web page of the manufacturer of the driver's accident vehicle 100, enters the vehicle identification number, and performs driver authentication to check the accident records of the driver, the vehicle manufacturer 30 may search for the location of transactions based on the vehicle identification number and provide, to the driver, at least part of driving record information obtained by digitally signing the transaction data.

If transaction data are detected through the search, the blockchain network system 10 may decrypt the transaction data and allow the transaction data to be retrieved only when the detected transaction data has a valid digital signature of at least one or more main users (S207).

More specifically, the blockchain network system 10 may configure a condition for decrypting transaction data.

In the embodiment, when the manufacturer of a vehicle 100 that has encountered an event and/or a driving function service provider 40 signs through a digital key, the blockchain network system 10 may allow retrieving of driving record information for which transaction data has been decrypted.

A method for storing driving record data or information based on a blockchain according to an embodiment of the present disclosure may be advantageous in that driving record information generated due to driving of a vehicle is stored and managed based on a blockchain, forgery and falsification of the driving record information can be prevented beforehand, and the cause of occurrence of an event may be identified clearly.

Also, a method for storing driving record data or information based on a blockchain according to an embodiment of the present disclosure may securely protect privacy information included in the driving record information and improve technical security at the time of storing the driving record information so that proprietary techniques of a service provider and/or vehicle manufacture may be protected.

Further, a method for storing driving record data or information based on a blockchain according to an embodiment of the present disclosure may be advantageous in that a vehicle may transmit driving record information to a blockchain network quickly and correctly at the occurrence of an accident.

The embodiments of the present disclosure may be implemented in the form of program commands which may be executed through various types of computer elements and recorded in a computer-readable recording medium. The computer-readable recording medium may include program commands, data files, and data structures separately or in combination thereof. The program commands recorded in the computer-readable recording medium may be designed and composed specifically for the present invention or may be commonly available for those skilled in the field of computer software. Examples of a computer-readable recoding medium may include magnetic media such as hard-disks, floppy disks, and magnetic tapes; optical media such as CD-ROMs and DVDs; magneto-optical media such as floptical disks, and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be composed to be operated by one or more software modules to perform the operations of the present invention, and vice versa.

Specific implementation of the present invention are embodiments, which does not limit the technical scope of the present invention in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present invention.

Also, although detailed descriptions of the present invention have been given with reference to preferred embodiments of the present invention, it should be understood by those skilled in the corresponding technical field or by those having common knowledge in the corresponding technical field that the present invention may be modified and changed in various ways without departing from the technical principles and scope specified in the appended claims. Therefore, the technical scope of the present invention is not limited to the specifications provided in the detailed descriptions of this document but has to be defined by the appended claims.

A method for storing driving record data or information based on a blockchain according to an embodiment of the present disclosure may be advantageous in that driving record information generated due to driving of a vehicle is stored and managed based on a blockchain, forgery and falsification of the driving record information can be prevented beforehand, and the cause of occurrence of an event is identified clearly.

Also, a method for storing driving record data or information based on a blockchain according to an embodiment of the present disclosure may securely protect privacy information included in the driving record information and improve technical security at the time of storing the driving record information so that proprietary techniques of a service provider and/or vehicle manufacture may be protected.

Additionally, a method for storing driving record data or information based on a blockchain according to an embodiment of the present may be advantageous in that a vehicle may transmit the driving record information to a blockchain network quickly and correctly at the occurrence of an accident.

What is claimed is:

1. A computer-implemented method performed by a processor included in a vehicle, the method comprising:
   generating and storing, by the processor of the vehicle, driving record information, generated while the vehicle is driven, to memory;
   detecting occurrence of a predetermined event associated with the vehicle using one or more sensors of the vehicle;
   in response to the detected occurrence of the event, extracting driving record information related to the event from the driving record information stored in the memory; and
   converting the extracted driving record information into transaction data, and transmitting the converted transaction data to a consortium blockchain network system, the consortium blockchain network system including a plurality of nodes corresponding to each of a vehicle manufacturer, a driving function service provider and a public institution;
   distributing a received transaction data to be shared among other nodes by a node which has first received the converted transaction data;
   storing the received transaction data before a confirmation into a memory pool or a transaction pool as a temporary list;
   generating a block according to a preconfigured condition, wherein the block includes the received transaction data stored in the temporary list;
   providing an index-based search engine interface that searches for the transaction data including the driving record information;
   detecting the transaction data through the search of the index-based search engine interface; and
   decrypting the detected transaction data and allowing the detected transaction data to be retrieved only when the detected transaction data has a valid digital signature of at least one or more the plurality of nodes,
   wherein the converting of the extracted driving information into the transaction data comprises:
   including index information of the driving record information in front data configured in a publicly open form, the index information comprising at least one of the driving function service provider index, vehicle manufacturer index, vehicle index, or driver index of the driving record information; and encrypting the extracted driving record information related to the event, and including the encrypted driving record information related to the event in main data, wherein the converted transaction data is transmitted to one node of the consortium blockchain network system in which the one node is not the vehicle manufacturer or the driving function service provider, and wherein the generating of the block according to the preconfigured condition comprises:

including a nonce in a block header, adjusting the difficulty so that the nonce is solved within a predetermined time, and determining a condition that a node that has found a hash of the block header by solving the nonce generates a new block.

2. The method of claim 1, wherein the generating and storing the driving record information includes storing the driving record information generated while the vehicle is driven with an autonomous navigation or driving assistance function.

3. The method of claim 2, wherein the driving record information includes one or more of vehicle status information, driving control information, vehicle surrounding information, and vehicle condition information, wherein the driving control information includes information related to a situation where the vehicle is driven by using the autonomous navigation or driving assistance function.

4. The method of claim 3, wherein the extracting the driving record information related to the event includes extracting driving record information generated during or at the detected occurrence of the event and driving record information generated before the detected occurrence of the event.

5. The method of claim 1, wherein the predetermined event includes at least one of accident occurrence, user request, and vehicle breakdown.

6. The method of claim 1, further comprising deleting the stored driving record information when no occurrence of the predetermined event is detected by the one or more sensors for a predetermined time period.

7. The method of claim 1, wherein the converting the extracted driving record information to the transaction data includes selecting from the driving record information stored in the memory and arranging the selected driving record information according to a standard rule.

8. The method of claim 7, wherein the converting the extracted driving record information to the transaction data further comprises adding at least part of the arranged driving record information to the front data.

9. The method of claim 8, wherein the front data is converted to a searchable state and included in the transaction data.

10. The method of claim 9, wherein the converting the extracted driving record information to the transaction data further comprises encrypting at least part of the arranged driving record information and adding the encrypted driving record information to the main data.

11. The method of claim 10, wherein the converting the extracted driving record information to the transaction data further comprises encrypting driving control information associated with operation of autonomous navigation or driving assistance function and adding the encrypted driving control information associated with the operation of the autonomous navigation or driving assistance function to the main data.

12. The method of claim 11, wherein the converting the extracted driving record information to the transaction data further comprises adding verification data created by verifying the front and the main data to the transaction data.

13. The method of claim 1, wherein the transmitting the converted transaction data to the consortium blockchain network system includes transmitting, by the vehicle, the transaction data to one node of the blockchain network system through a network.

14. The method of claim 13, wherein the transmitting the converted transaction data to the consortium blockchain network system includes:

transmitting, by the vehicle, the transaction data to a traffic communication facility connected to the consortium blockchain network system; and transmitting, by the traffic communication facility, the transmitting data to at least one node of the blockchain network system.

15. The method of claim 10, wherein the transmitting the converted transaction data to the consortium blockchain network system includes:

transmitting, by the vehicle, the transaction data to another vehicle connected to the consortium blockchain network system; and transmitting, by the another vehicle, the transaction data to at least one node of the blockchain network system.

16. The method of claim 10, wherein the transmitting the converted transaction data to the consortium blockchain network system includes:

detecting a plurality of communication facilities;

detecting one of communication facilities;

transmitting, by the vehicle, the transaction data to the detected communication facility; and transmitting, by the detected communication facility receiving the transaction data, the transaction data to at least one node of the blockchain network system.

* * * * *